Feb. 23, 1954
M. N. HOLMES
2,669,866
HOSIERY LENGTH MEASURING DEVICE
Filed June 2, 1952
2 Sheets-Sheet 1
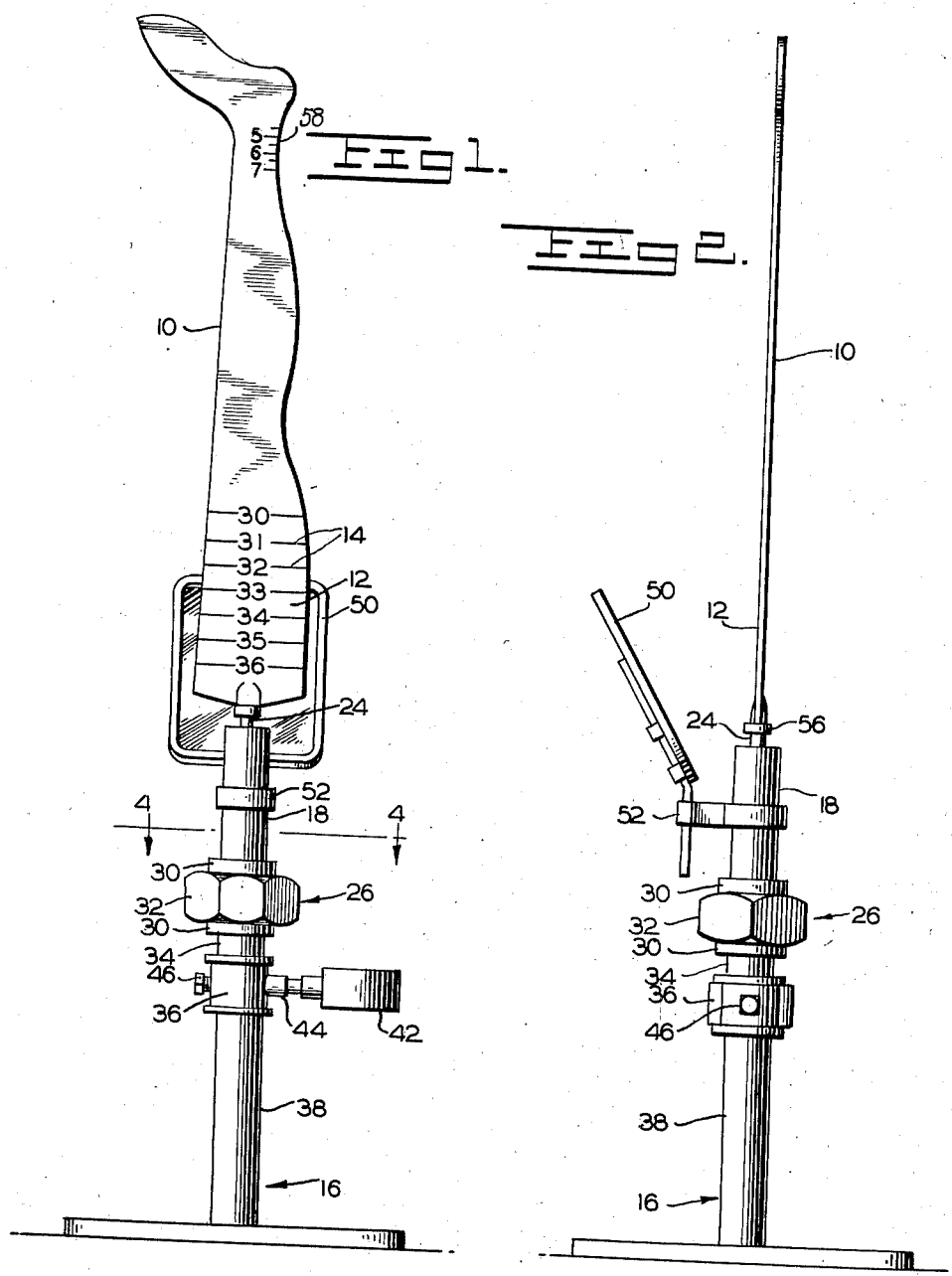
INVENTOR
MARK N. HOLMES
BY Cushman, Darby & Cushman
ATTORNEYS Feb. 23, 1954
M. N. HOLMES
2,669,866
HOSIERY LENGTH MEASURING DEVICE
Filed June 2, 1952
2 Sheets-Sheet 2
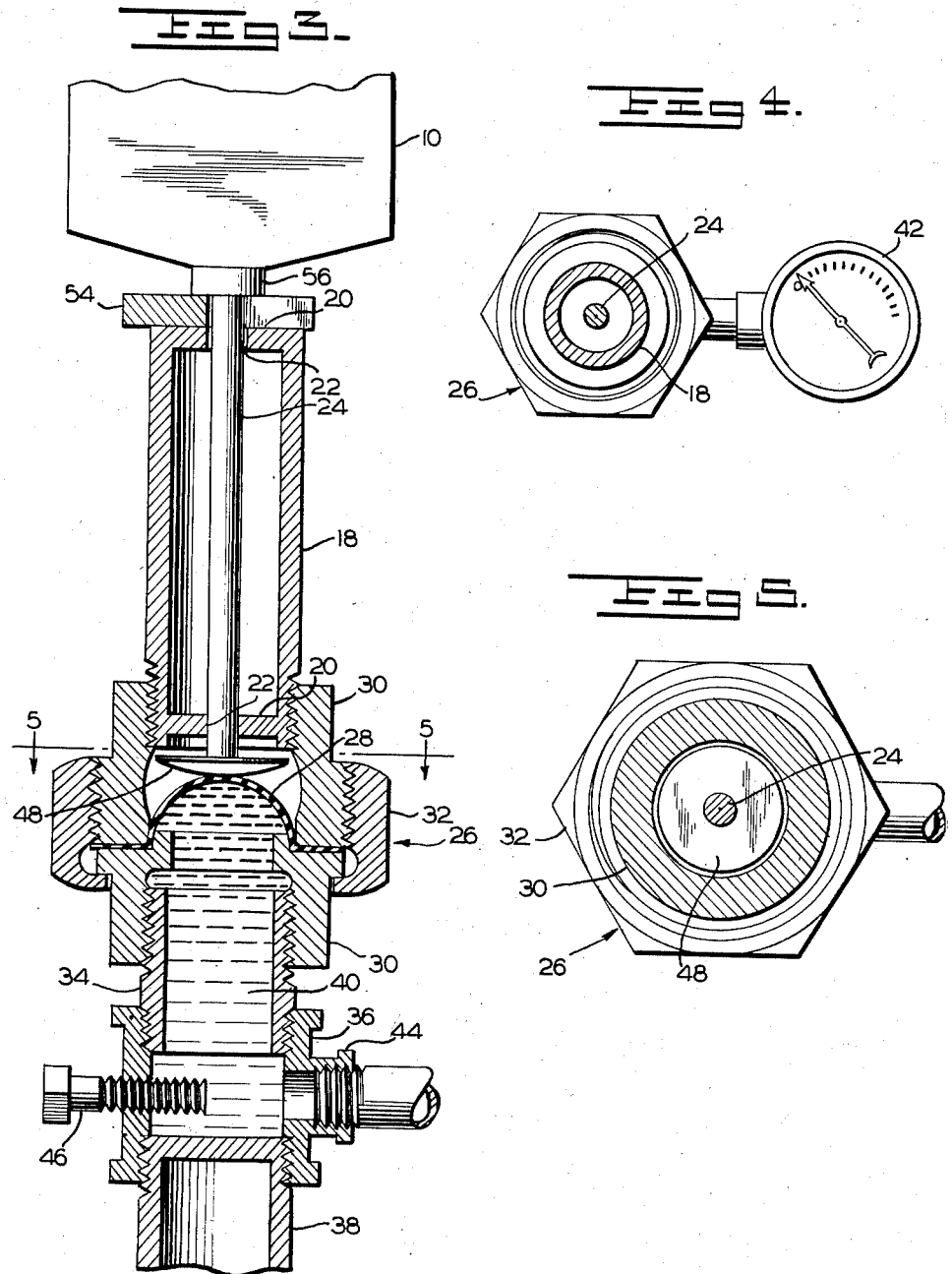
INVENTOR
MARK N. HOLMES
BY Cushman, Darby & Cushman
ATTORNEYS Patented Feb. 23, 1954

2,669,866

UNITED STATES PATENT OFFICE 2,669,866

HOSIERY LENGTH MEASURING DEVICE

Mark N. Holmes, Burlington, N. C., assignor to Burlington Mills Corporation, Greensboro, N. C., a corporation of Delaware Application June 2, 1952, Serial No. 291,173

6 Claims. (Cl. 73—89)

This invention relates to a hosiery length measuring device, and more particularly to a device for measuring the lengths of ladies' full-fashioned hose, although the device may be used for measuring the lengths of seamless hose and half hose.

In the ladies' hosiery industry, particularly nylon hosiery, it is difficult to produce hose of uniform lengths. This difficulty is due mainly to the resilient and plastic characteristics of nylon yarn which give rise to certain variable factors in the several manufacturing operations. Some of these variable factors that affect length of hose are static electricity, excessive tension, yarn creep, and yarn shrinkage. Knitting machines can be and are carefully adjusted to produce hosiery of proper and uniform lengths, but in spite of these careful adjustments, considerable variation in hosiery length occurs because of changes in the above factors. Hence, during manufacture, samples of finished knitted hose frequently are measured for length to make sure that such lengths are within prescribed limits. If the lengths vary from such limits, the knitting machines are readjusted to bring the lengths of subsequently knitted hose back within the prescribed tolerances.

Since unboarded nylon stockings are inherently stretchable and do not readily resume their original dimensions upon being stretched out of shape, the sample measuring of hosiery lengths now is usually performed after the hose has been knit, looped, seamed, dyed, and finished (including boarding). It is obvious, however, that if only finished hosiery is measured for length, the manufacturing operation will have progressed a considerable extent past the point of length control, namely, the actual knitting operation wherein machine adjustments must be made to control hosiery length. Hence, a large number of hose of improper lengths will have been knitted before the knitting machines can be readjusted to knit proper lengths. It has now been found that if hosiery is measured for length after the looping and seaming operations, and while each hose is under the same tension, the finished length of the hose can be predetermined after allowing a factor for shrinkage during the dyeing and finishing operations. In other words, the length of the hosiery can be measured and length variations noted in the foregoing manner even before the hose has been set to its final length by the boarding operations used in the finishing of nylon hose.

Furthermore, final hosiery length is subject to variation, not only by the actual knitting thereof, but also by the final boarding operation, because the stockings may be pulled too tightly over the boarding form by the operators and, therefore, set to an improper length. Hence, it is desirable to provide a device for accurately and readily measuring the length of hosiery while subjected to the same tension immediately preceding and immediately following the final boarding operation, in order to determine whether the boarding operators are placing the stockings on the boarding forms with the same proper degree of tension.

Hence, it is an object of this invention to provide a device for measuring the length of hosiery and for subjecting each hose, prior to measurement, to the same predetermined longitudinal tension.

It is a further object of this invention to provide a simple and consequently inexpensive and easily operable device for measuring the lengths of hosiery and for subjecting each hose being measured to the same predetermined tension.

Other objects and advantages of the invention will be evident from the following description and accompanying drawings, in which:

Figure 1 is a front elevational view of a hosiery length measuring device embodying this invention.

Figure 2 is a side elevational view of the device shown in Figure 1, and taken from the left-hand side of the latter figure.

Figure 3 is an enlarged fragmentary sectional view of a portion of the device shown in Figure 1.

Figure 4 is a sectional view taken on the line 4—4 of Figure 1.

Figure 5 is a sectional view taken on the line 5—5 of Figure 3.

Referring now to the drawings, there is shown in Figure 1, a flat hosiery form 10, which may be a conventional boarding form. On the welt area 12 of the form 10 are a plurality of evenly spaced transverse lines 14, each provided with length indicia, normally inch indications, for measuring the length of a hose mounted on the form. This scale (indicia and lines 14) covers a range consistent with the type of hose to be measured. It can be seen, however, that when hosiery is pulled onto the form by an operator, it is done with varying degrees of force, even by the most skilled operator. Unboarded nylon stockings are inherently stretchable but not very elastic. Therefore, because of the variation in longitudinal tension applied to the hosiery fabric in pulling the hose onto the form 10, an accurate determination of hosiery lengths will not be obtained with the desired degree of uniformity.

In order to overcome the aforementioned difficulty, this invention provides simple means for enabling an operator to successively and separately place a series of stockings on the form, each with the same degree of longitudinal or lengthwise force applied thereto.

A pedestal 16 supports at its top a vertical tubular member 18 having transverse partitions 20 at each end thereof, as shown in Figure 3. The partitions 20 are provided with axial apertures 22 of a size to slidably receive a rod 24 extending longitudinally and centrally from the welt end of the form 10 to support the latter foot upwards in the vertical position shown in Figures 1 and 2 of the drawings. Threadedly secured to the lower end of the form-supporting member 18 is a pipe coupling 26 having a concavo-convex flexible diaphragm 28, of rubber or other appropriate material, clamped between the two coupling members 30 by a coupling ring 32. A short nipple 34 is threaded into the lower coupling member 30 and into the upper end of an interiorly threaded fitting 36 that is, in turn, threaded onto the upper closed end of the tubular post 38 of the pedestal 16.

The interior closed chamber 40 thus formed, by the flexible diaphragm 28, the lower coupling member 30, the nipple 34, the fitting 36, and the closed upper end of the pedestal post 38, is filled with a relatively viscous liquid, such as glycerine or hydraulic brake fluid. A pressure gauge 42 is connected to an apertured boss 44 on the side of the fitting 36, and the fitting also has a screw 46 threaded through a side wall thereof and projecting into the chamber 40 for a purpose later described.

The lower end of the rod 24 is provided with a transverse plate or disc 48 resting upon the convex upper surface of the diaphragm 28. Hence, pressure variations of the fluid within the chamber 40 effected by downward forces of the rod 24 on the diaphragm 28 may be measured by the pressure gauge 42.

In operation of the device, an operator draws a stocking over the foot portion of the form 10, then grasps the edge of the welt of the stocking, on both sides of the form, and pulls the welt uniformly downwardly over the welt area 12 of the form while watching the pressure gauge 42. When the pressure gauge indicates a predetermined pressure, for example nine pounds, the operator slowly releases his grasp upon the edge of the welt of the stocking and, after waiting a brief period to allow for creep back, measures the length of the stocking as indicated by the scale on the welt area of the form. The next stocking is measured in the same manner and at the same pressure indication on the pressure gauge, so that both stockings, and all succeeding stockings, have the same degree of longitudinal stretch when measured for length. Hence, their measured lengths are directly comparable without variations caused by differing degrees of stretch in the stockings.

As an aid to the operator, who stands while pulling a stocking onto the form 10, a mirror 50 may be supported on any convenient part of the device, as by a bracket 52 fastened to the member 18, in an inclined position to one side of the welt area of the boarding form 10, so that the reflection of the scale may be seen by a standing operator. The provision of such a mirror eliminates the necessity of an operator stooping down to one side to read a stocking measurement, thereby considerably speeding up the measurement of a plurality of stockings. Obviously, scale indicia to be so reflected should be reversed on the form 10.

The screw 46 which is threaded through a side wall of the fitting 36 is used to calibrate the pressure gauge 42. It can be seen that as the screw 46 is threaded in and out of the chamber 40, the consequent displacement of fluid by the inner portion of the screw changes the pressure of such liquid. In practice, the screw 46 may be adjusted so that the pressure gauge reads zero when no stocking is being measured on the device.

It is desirable, when the device is not in use, that the boarding form 10 be raised slightly and a hook-like element or slotted washer 54 placed about the rod 24 between the collar 56 thereon and the top of the supporting member 18 (as shown in Figure 3) in order to relieve the diaphragm 28 of the weight of the form. In this manner, distortion or undue weakening of the diaphragm by a constant weight resting thereon is prevented.

It will also be seen that the boarding form 10 has a size scale 58 upon its heel area, so that the heel size as well as the length of a stocking may be measured while the latter is on such form, such heel scale being readily visible through the almost transparent fabric of the stocking.

It will thus be seen that the objects of this invention have been fully and effectively accomplished. It will be realized, however, that the specific embodiment illustrated and described for the purpose of disclosing this invention is susceptible to various changes without departing from such principles. Therefore, this invention embraces all modifications encompassed by the spirit and scope of the following claims.

I claim:

1. A hosiery length measuring device comprising: a hosiery form having length indicia on the welt area thereof; means for yieldably supporting said form from the welt end thereof for longitudinal movement; and force measuring means responsive to movement of said form on said supporting means for measuring the longitudinal force applied to said form by a longitudinal stretching force applied to the welt edge of a stocking thereon.

2. The structure defined in claim 1 including size indicia on the heel area of the form.

3. A device for measuring the length of hosiery under a predetermined uniform longitudinal tension comprising: a boarding form having hosiery length indicia on the welt area thereof; means operatively mounted with respect to the welt end of said form for yieldably supporting the same in a vertical position with the foot up; and force measuring means responsive to movement of said form on said supporting means for measuring the longitudinal force applied to said form by the application of a longitudinal stretching force to the welt edge of a stocking thereon.

4. A device for measuring the length of hosiery under a predetermined uniform longitudinal tension comprising: a boarding form having hosiery length indicia on the welt area thereof; a longitudinal supporting rod secured to the welt end of said form; a bearing supporting said rod between the ends thereof; means defining a closed fluid-filled chamber; a flexible diaphragm forming a wall of said chamber and having the free end of said rod bearing against the outer side thereof; and means for measuring the changes in pressure of the fluid in said chamber effected by applying a longitudinal stretching force to the welt edge of a stocking on said form.

5. A device for measuring the length of hosiery under a predetermined uniform longitudinal tension comprising: a boarding form having hosiery length indicia on the welt area thereof; a longitudinal supporting rod secured to the welt end of said form; a pedestal having a vertical bearing for said rod at the upper end thereof; a closed fluid-filled chamber within said pedestal beneath said bearing; a flexible diaphragm forming an upped wall of said chamber and having the lower end of said rod resting thereon; and a pressure gauge connected to said chamber and disposed in a generally upwardly facing position to one side of said pedestal.

6. A hosiery length measuring device comprising: A hosiery form having length indicia on the welt and heel thereof; a longitudinal supporting rod secured to the welt end of said form for supporting the same in a vertical position with the foot up; a bearing supporting said rod between the ends thereof; means defining a closed fluid-filled chamber; a flexible diaphragm forming a wall of said chamber and having the free end of said rod bearing against the outer side thereof; and means for measuring the changes in pressure of the fluid in said chamber effected by applying a longitudinal stretching force to the welt edge of a stocking on said form.

MARK N. HOLMES.

References Cited in the file of this patent

UNITED STATES PATENTS

| Number | Name | Date |
|---|---|---|
| 2,242,589 | Meyer | May 20, 1941 |
| 2,268,677 | Shearer et al. | Jan. 6, 1942 |
| 2,369,661 | Dangelmajer | Feb. 20, 1945 |

FOREIGN PATENTS

| Number | Country | Date |
|---|---|---|
| 594,548 | Great Britain | Nov. 13, 1947 |